United States Patent [19]

Torii et al.

[11] 4,418,471
[45] Dec. 6, 1983

[54] METHOD OF PRODUCING A STATOR YOKE OF A SMALL-SIZED MOTOR

[75] Inventors: Michihiro Torii, Hamamatsu; Hiroaki Kobayashi, Toyohashi, both of Japan

[73] Assignee: Fuji Electrochemical Co., Ltd., Tokyo, Japan

[21] Appl. No.: 267,475

[22] Filed: May 27, 1981

[51] Int. Cl.³ .......................................... H02K 15/02
[52] U.S. Cl. ...................................... 29/596; 72/332; 72/348; 83/188; 83/621; 83/622; 83/688; 310/42
[58] Field of Search .................... 29/596, 598; 310/42, 310/49 R, 162, 163, 257, 263; 72/332, 338, 348; 83/54, 621, 622, 688, 188

[56] References Cited

U.S. PATENT DOCUMENTS 3,551,711 12/1970 Davis .................................. 310/43
3,696,260 10/1972 Lace ................................ 310/263 X
3,736,826 6/1973 Hof .................................. 83/621 X
4,314,472 2/1982 Saegusa et al. .................... 72/348 X Primary Examiner—Carl E. Hall
Attorney, Agent, or Firm—Fleit, Jacobson, Cohn & Price

[57] ABSTRACT

A method of producing a stator yoke of a motor such as an inner rotor type stepper motor, the yoke having a multiplicity of polar teeth. The method has the steps of forming an intermediate blank which has an outer cylindrical portion and an inner cylindrical portion projecting in the same direction, effecting a shearing on the outer peripheral surface of the inner cylindrical portion to cut out a multiplicity of polar teeth arranged at a constant pitch, and effecting a punching to deepen and widen portions between the bases of adjacent polar teeth.

7 Claims, 16 Drawing Figures

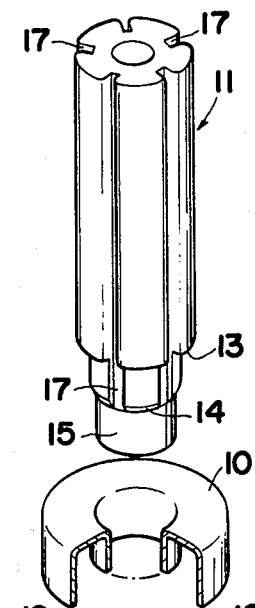
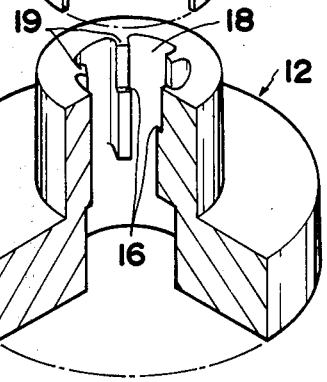
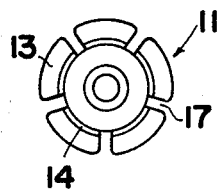
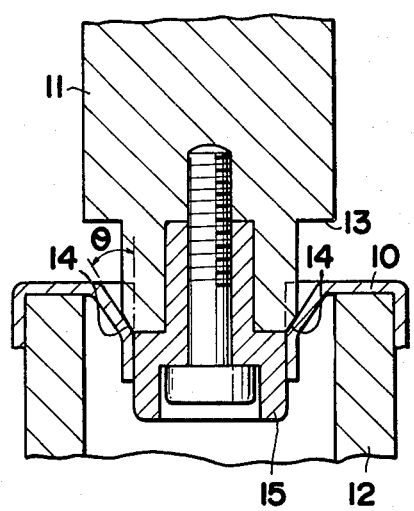
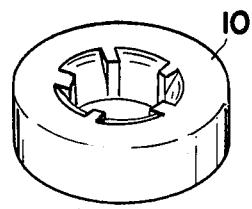
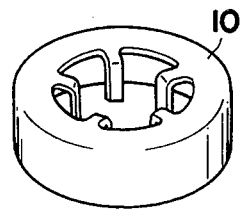

METHOD OF PRODUCING A STATOR YOKE OF A SMALL-SIZED MOTOR

BACKGROUND OF THE INVENTION

The present invention relates to a method of producing a stator yoke of a small-sized motor and, more particularly, to a method of producing a stator yoke of the type having a multiplicity of teeth-like magnetic pole pieces (i.e., polar teeth) formed on its peripheral surface, e.g. the stator yoke of an inner rotor type stepper motor of small capacity.

The inner rotor type stepper motor of the kind described has been known. A typical example of this kind of motor will be outlined hereinunder.

Referring to FIG. 1, the stator portion is constituted mainly by an outer yoke 1, inner yoke 2 and a coil 3 disposed therebetween. Two units of the outer yoke 1, inner yoke 2 and the coil 3 are assembled to form the stator portion. The outer yoke 1 has a multiplicity of poplar teeth which are projecting in the axial direction from the inner peripheral portion thereof at a constant pitch. The inner yoke 2 has substantially similar construction to the outer yoke 1. With a coil 3 interposed therebetween, the outer yoke 1 and the inner yoke 2 are assembled together in such a manner that the polar teeth of the outer and inner yokes 1,2 are positioned in a staggered relation. A pair of assemblies, each having the inner and outer yokes, are assembled together with their inner yokes 2 positioned in a back-to-back relation and at an angular displacement that the polar teeth of the inner yokes 2 are offset or skewed at an angle amounting to one fourth (¼) of the angular pitch of these teeth. Namely, the inner yokes 2 are in an opposed relation with each other, and the polar teeth of one inner yoke are staggered by one fourth of the angular degree of the polar teeth of the other inner yoke. This assembly accomodates a rotor portion which is rotatably mounted by means of the bearings 4. The rotor portion includes a shaft 5 and an annular permanent magnet 6 having a multiplicity of magnetized poles and fixed to the shaft 5. As an electric current is supplied in the form of pulses, the rotor makes an intermittent rotation in a stepped manner by the magnetomotive force.

Hitherto, some methods have been practically used for forming the stator yoke which has a multiplicity of inner peripheral polar teeth. For instance, a plurality of U-shaped cuts are formed radially in the end surface of a cup-shaped yoke, and the portions confined between the U-shaped cuts are bent inwardly to form a plurality of magnetic polar teeth. Alternatively, the end surface of the yoke shaped in a cup-like form is punched to have a form of an internally toothed gear and then the teeth portions are bent inwardly.

These methods, however, cannot provide polar teeth having sufficiently large length relative to the outside diameter of the motor and, therefore, cannot suitably be used in the production of motor having a large height and a large torque.

Particularly, in the former method, since the end surfaces of the magnetic polar teeth of one yoke oppose to the end surface, i.e. magnetic web of the other yoke, the magnetic flux inconveniently leaks to this portion to undesirably lower the torque. In addition, in the former method, a magnetic path between the polar teeth and the yoke body is constituted by the portions which are not punched out, it is not possible to excessively reduce the distance between the base portions of the adjacent magnetic poles.

In the latter method, the shape after the punching inevitably has a large distance between the base portions of the adjacent magnetic polar teeth.

Thus, neither of these known two processes can provide a large number of steps for a given outside diameter of the motor. In addition, in the conventional motors formed by these known processes, the magnetic pieces face in a flat plate-like manner to the cylindrical rotor surface, because these magnetic polar teeth are raised from the plane of the web portion of the yoke, so that a loss or waste of magnetic path is formed inevitably.

SUMMARY OF THE INVENTION

An object of the present invention is to provide a new method of producing a stator yoke for a high performance small-sized motor having a multiplicity of polar teeth.

Another object of the present invention is to provide a method of producing a stator yoke which method permits to produce a large length of polar teeth for a given motor diameter to ensure a higher torque of the motor.

Another object of the present invention is to provide a method for producing a stator yoke which has an increased number of polar teeth to permit an increased number of steps for a given motor diameter.

A futher object of the present invention is to provide a method of producing a stator yoke, the method permitting the magnetic polar teeth to be arranged circularly around a rotor surface to ensure an efficient application of the magnetic field produced by the stator to the rotor, thereby to overcome the aforementioned problems of the prior art.

Briefly, the method of the present invention has the steps of forming an intermediate blank which has an outer cylindrical portion and a central cylindrical portion projecting in the same direction as the outer cylindrical portion, effecting a shearing on the outer peripheral surface of the central cylindrical portion to cut out a multiplicity of polar teeth arranged at a constant pitch, and effecting a punching to deepen portions between the bases of adjacent polar teeth. The intermediate blank is preferably formed by preparing a sheet-like member of a magnetic material and subjecting the sheet-like member to a drawing to bend the outer peripheral portion to form the outer cylindrical portion and to form the central cylindrical portion.

BRIEF DESCRIPTION OF THE DRAWINGS

FIG. 3 is a perspective view of an exemplified device for forming magnetic polar teeth of the yoke, showing a punch, intermediate blank and a die.

FIG. 4 is a bottom plan view of the punch illustrated in FIG. 3.

FIG. 5 is an enlarged sectional view of the punch and die, showing the state of shearing of the intermediate blank.

FIGS. 6A and 6B are perspective views of the intermediate blank in the state after the shearing and after a punching, respectively.

DETAILED DESCRIPTION OF PREFERRED EMBODIMENTS

Figure 2A:
FIGS. 2A through 2F show in cross section a process for forming an intermediate blank for the yoke.
Figure 2B:
Figure 2C:
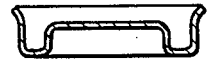
Figure 2D:
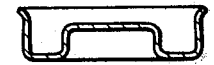
Figure 2E:
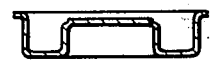
Figure 2F:
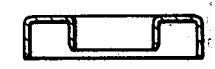

Referring first to FIGS. 2A through 2F, a flat sheet, which is illustrated by phantom lines in FIG. 2A of about 1.0 mm thick and about 62 mm in diameter is prepared at the first step. The flat sheet is made of a material having a high magnetic permeability such as a magnetic soft iron. This sheet material is then subjected to a drawing to form a disk-like concavity as shown in FIG. 2A, having a diameter of about 48 mm and a height of about 13 mm. Then, the dish-like blank is further drawn into a bowl-like form as shown in FIG. 2B to have, for example, a maximum diameter of about 46 mm and a maximum depth of about 21 mm. Thereafter, as shown in FIGS. 2C, 2D and 2E, a drawing is successively applied to raise a central bottom portion into a cylindrical form. The, after a trimming of the outer peripheral edge, the central end surface is punched as illustrated in FIG. 2F and then a projected end of the inner cylindrical portion is spread slightly. These processings are ordinarily taken and will be understood from the foregoing, and a further detailed description will not be made.

Referring now to FIGS. 3, 4 and 5, the intermediate blank 10 thus formed is processed by a cooperation between a punch 11 and a die 12 as shown in FIG. 3, so that a multiplicity of magnetic polar teeth are formed on the inner peripheral portion of the blank 10. The punch 11 is an elongated columnar member having a flower-like cross section with five petals to form elongated grooves 17 between the adjacent "petals", and is provided at its lower end portion with a punching edge 13 which is formed at right angles relative to the axis of the punch. The portion below the punching edge 13 has a reduced diameter and is provided at its lower end portion with a cutting edge 14 inclined at an acute angle "$\theta$", preferably about 30° C., relative to the axis of the punch 11. The lower extremity of punch 11 constitutes a pilot 15 which has a reduced diameter so as to be flush with the grooves 17, the diameter matching the inner cylinder of the intermediate blank 10. The cutting edge 14 has a thickness somewhat greater than the thickness of the inner cylinder and a height slightly greater than that of the same. The die 12 has a bore 18 for snugly receiving the punch 11 having the five-petal flower-like section and is provided with five projections 19 corresponding to the five grooves 17. Each projection 19 has a shoulder 16 for receiving the inner cylindrical portion of the intermediate blank 10.

The die 12 and the punch 11 are secured to an ordinary punching press to shape the predetermined magnetic polar teeth. As will be seen from FIG. 5, the punch 11 is lowered from the upper side of the intermediate blank 10 fitted on the die 12. In consequence, the pilot 15 is inserted into the inner cylindrical portion of the intermediate blank 10. As the punch 11 is gradually driven, portions other than the five polar teeth are cut and depressed radially outwardly and immediately bent as shown in FIGS. 5 and 6A. Immediately thereafter, the punching edge 13 comes in contact with the upper inner portions, which have been depressed as described, of the intermediate blank 10 to effect the punching. As a result, the portions or strips of the blank between adjacent polar teeth are severed to complete the steps, as shown in FIG. 6B.

Figure 1:
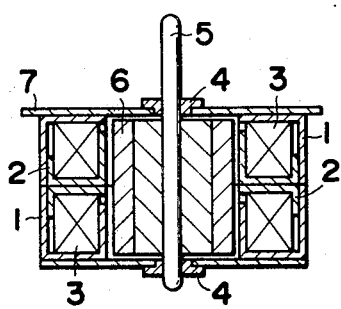
FIG. 1 is a sectional view of a small-sized stepper motor to which the present invention is applicable.

Subsequently, the blank 10 is subjected to mechanical processings such as formation of projections for the resistance welding between yokes or between the yoke and a flange 7 (FIG. 1), formation of locating or registration hole (not shown), correction of the polar teeth and so forth. In order to eliminate any processing strain which may remain after these works, an annealing is preferably effected in a vaccum (at 800°–900° C. for 3 hours).

Figure 7:
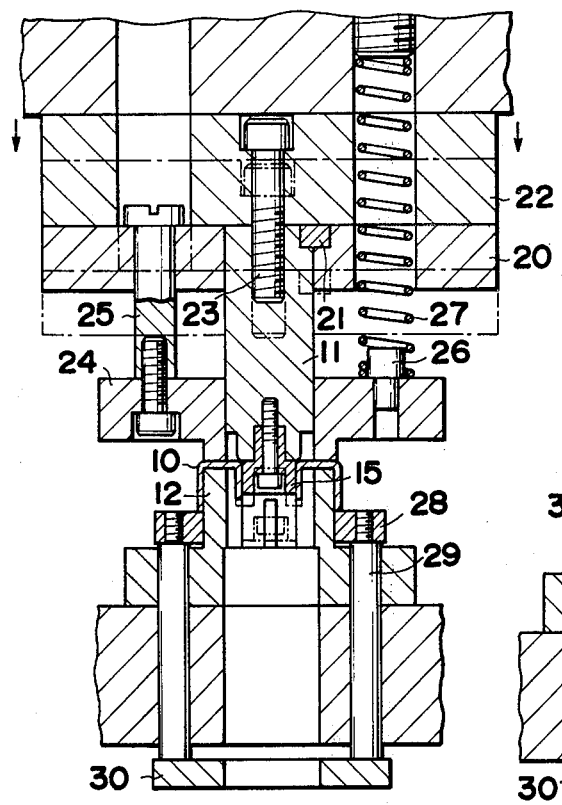
FIG. 7 is a sectional view of an example of a die assembly mounted on an actual press machine.

According to the invention, the formation of the magnetic polar teeth is effected as a concept by means of the punch 11 and the die 12. FIG. 7 shows a die construction which can be used practically. A punch plate 20 is fitted around the upper portion of the punch 11. The punch plate 20 and the punch 11 are fixed together in the rotational direction by means of a key 21, and are secured to a back plate 22 by means of a bolt 23. An upper stripper 24 is secured to a lower portion of the punch 11 and is supported by a support bolt 25 slidably fitted to the punch plate 20, so as to drop off from the punch plate 20.

The upper stripper 24 is urged away from the punch plate 20 by a spring 27 fitted around a spring guide 26, so that the upper stripper 24 is maintained at the position limited by the support bolt 25, i.e. at such a position where the lower end surface of the upper stripper 24 is flush with the juncture surface between the punch 11 and pilot 15.

A lower die assembly includes a lower stripper 28 around the die 12, a support bolt 29 for supporting the lower stripper 28 and a lifting washer 30 for the support bolt 29.

As the upper die assembly is lowered onto the intermediate blank 10 fitted on the die 12, the upper stripper 24 contacts, and presses downward, the upper end surface of the intermediate blank 10 to thereby lower the lower stripper 28, support bolt 29 and lifting washer 30, so that the intermediate blank 10 is in a close fit to the die 12 as illustrated in FIG. 7. Then, as the upper die assembly is further lowered, the upper stripper 24 holds the intermediate blank 10 firmly and the punch 11 is lowered to cut out the inner cylindrical portion in the axial direction as illustrated in FIG. 6A. This cutting is effected by the inclined shearing edge 14 of the punch. Then, as the upper die assembly is further lowered, the portions of the intermediate blank 10 between the adjacent magnetic polar teeth are punched to a larger depth and width to form a complete yoke as illustrated in FIG. 6B. The positional relationship of the dies in this stage is shown by phantom lines in FIG. 7. Thereafter, as the upper die assembly is raised and the lifting washer is moved upward, the lower stripper 28 is slightly moved upwardly to permit the yoke having a multiplicity of polar teeth to be taken out of the die assembly.

Figure 8:
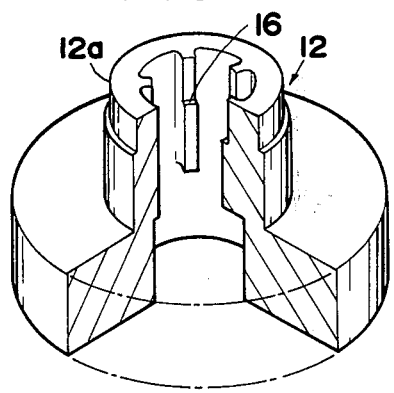
FIG. 8 is a perspective view of a modified form of the die.

A yoke assembly is composed primarily of an outer yoke and an inner yoke fitted in the former. Therefore, the die 12 has such a shape that, as shown in FIG. 8, the diameter of the upper part 12a is reduced by a size corresponding to the thickness of the yoke material. The height of the reduced diameter portion 12a is designed to be smaller than the height of the outer yoke to be formed.

Figure 9A:
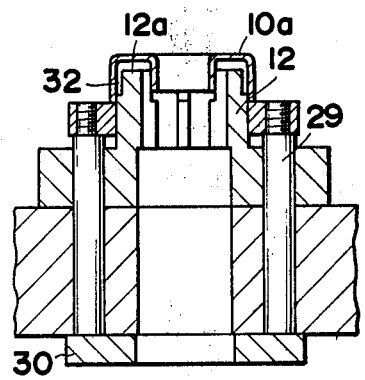
FIGS. 9A and 9B are sectional views of lower die assembly for the formation of the outer yoke and inner yoke, respectively.
Figure 9B:
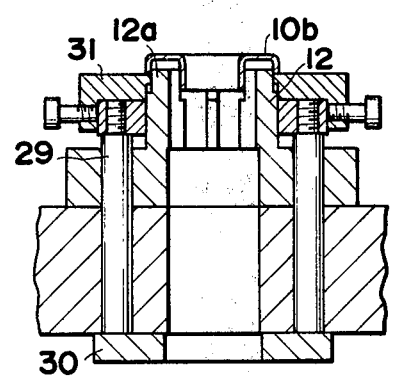

In FIGS. 9A and 9B, the intermediate blank 10a for the outer yoke has an outer periphery which is greater than that of the intermediate blank 10b for the inner yoke by a size corresponding to the thickness of the yoke material. The formation of the magnetic polar teeth of the outer yoke is conducted, as shown in FIG. 9A, by fitting the intermediate blank 10a on the die 12. In this state, a gap 32 is left between the outer periphery of the upper part 12a of the die 12 and the intermediate blank 10a. As will be understood from FIG. 9B, the formation of the polar teeth of the inner yoke is made after fitting an adapter 31. Since the intermediate blank 10b of the inner yoke has a reduced diameter, no gap is formed between the blank 10a and the upper outer periphery of the die 12, and the height of the outer periphery is also small. The upper die assembly may be identical and used for both inner and outer yokes without an adapter. Thus, it is possible to form the magnetic polar teeth of the outer and inner yokes by the same die assemblies, although the adapter 31 has to be attached to the die assembly for the formation of the inner yoke. The outer and inner yokes thus formed are assembled together in such a manner that their teeth-like pole pieces are staggered.

As has been described, according to the invention, the multiplicity of teeth-like magnetic pole pieces are formed by a shearing after shaping of the blank 10 into a cylindrical form, rather than the cutting and raising. It is, therefore, possible to obtain a sufficiently large length of the magnetic polar teeth of the stator for a given outside diameter of the motor, which in turn permits a more efficient use of the magnetic fields of the stator and the rotor, to ensure a higher output torque of the motor. In addition, it is possible to increase the number of operational steps of the motor, i.e. the number of the magnetic polar teeth. The method of the invention makes it possible to form the end surfaces of the magnetic polar teeth in an arcuate form along the outer peripheral surface of the rotor. It is recalled that, in the prior art, the magnetic polar teeth can have only straight or flat shape. In consequence, the magnetic field produced by the stator can apply to the rotor in a more efficient manner to ensure an increased output torque to save the electric power. Namely, the loss of magnetic path in the motor is reduced while the effective interacting magnetic flux is increased to ensure a higher output torque than the conventional motor for a given input electric current.

In addition, according to the invention, the recessed portions between the adjacent polar teeth are punched to increase their sizes so that each of the magnetic polar teeth of one yoke does not oppose to any magnetic portion of the other yoke. In consequence, the leak of magnetic flux in the axial direction is reduced as compared with the conventional construction to ensure more efficient use of the magnetic field formed by the rotor, i.e. an increase of the motor output torque.

Thus, the present invention offers a great advantage over the prior art, through remarkable improvement in the performance of the motor as a whole.

What is claimed is:

1. A method of producing a stator yoke of a motor wherein said stator yoke has a multiplicity of polar teeth, comprising the steps of:
    a. forming an intermediate blank so that said blank has an inner cylindrical portion and an outer cylindrical portion projecting in the same direction as said inner cylindrical portion,
    b. cutting said inner cylindrical portion along an axial direction of said blank to form a multiplicity of polar teeth arranged at a constant pitch, said cutting being conducted by a cutting edge inclined at an acute angle relative to the axis of said blank, and
    c. effecting a punching to deepen portions between bases of the adjacent polar teeth.

2. The method according to claim 1, in which said intermediate blank is formed by subjecting a sheet of a magnetic material to a drawing to bend an outer peripheral portion in the form of a cylindrical shape and to form said inner cylindrical portion.

3. The method according to claim 1, in which said cutting is conducted by means of a punch having a cutting edge, said cutting edge making an acute angle relative to an axis of said punch.

4. The method according to claim 3, in which said punching is continuously carried out after said cutting by means of said punch.

5. The method according to claim 3, in which said edge is inclined at about 30° relative to the axis of said punch.

6. The method according to claim 1, in which the punched blank is annealed in a vaccum at about 800°-900° C. for three hours.

7. A method of producing a stator yoke of a motor wherein said stator yoke has a multiplicity of polar teeth, comprising the steps of:
    a. preparing a flat sheet of a material having a high magnetic permeability,
    b. subjecting said flat sheet to drawing to form a dish-like structure and then to form a bowl-like structure,
    c. subjecting said bowl-like structure to a drawing successively to raise a central bottom portion of the bowl-like structure into a cylindrical form,
    d. punching a central end surface of the cylindrically formed structure, thereby forming a blank having an inner cylindrical portion and an outer cylindrical portion such that said inner and outer cylindrical portions project in the same direction,
    e. effecting a cutting on an outer peripheral surface of said inner cylindrical portion by means of a punch to form a multiplicity of polar teeth arranged at a constant pitch, said punch having an edge inclined at about 30° relative to an axis of said punch, and
    f. punching said blank to deepen portions between bases of the adjacent polar teeth.

* * * * *